United States Patent Office 2,975,526
Patented Mar. 21, 1961

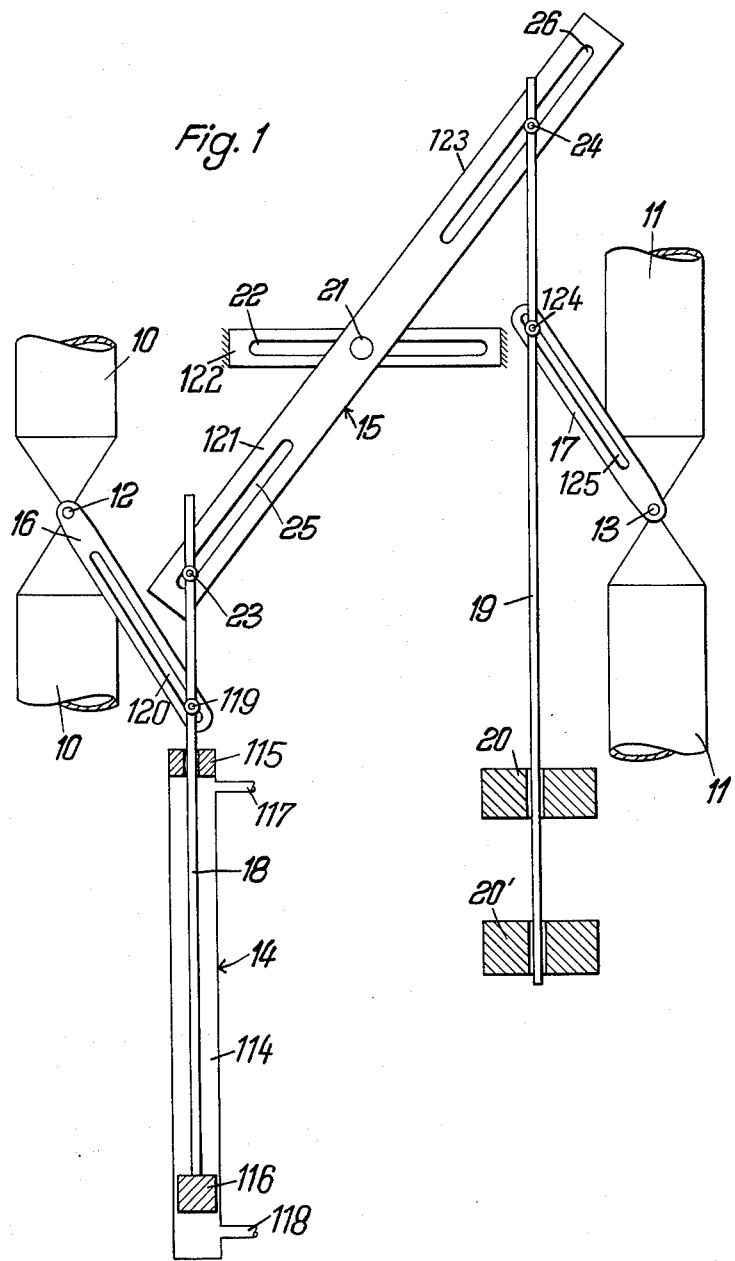

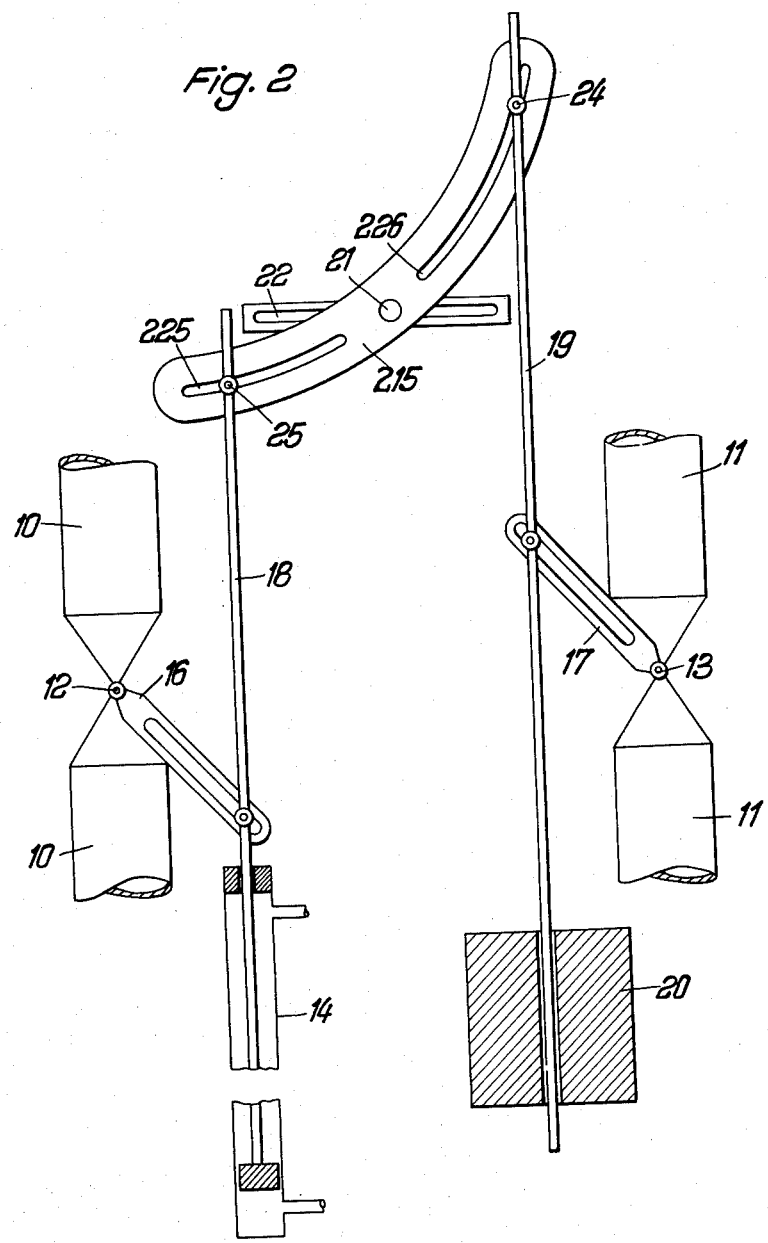

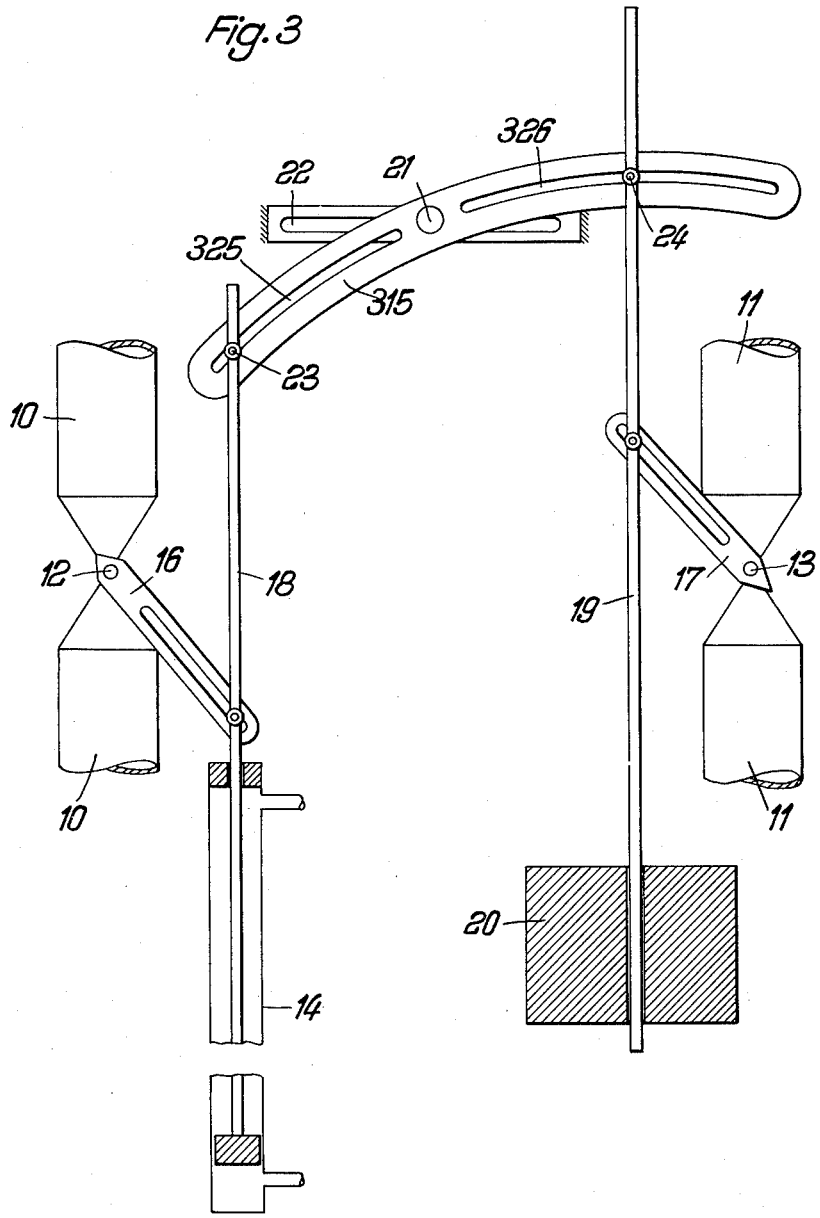

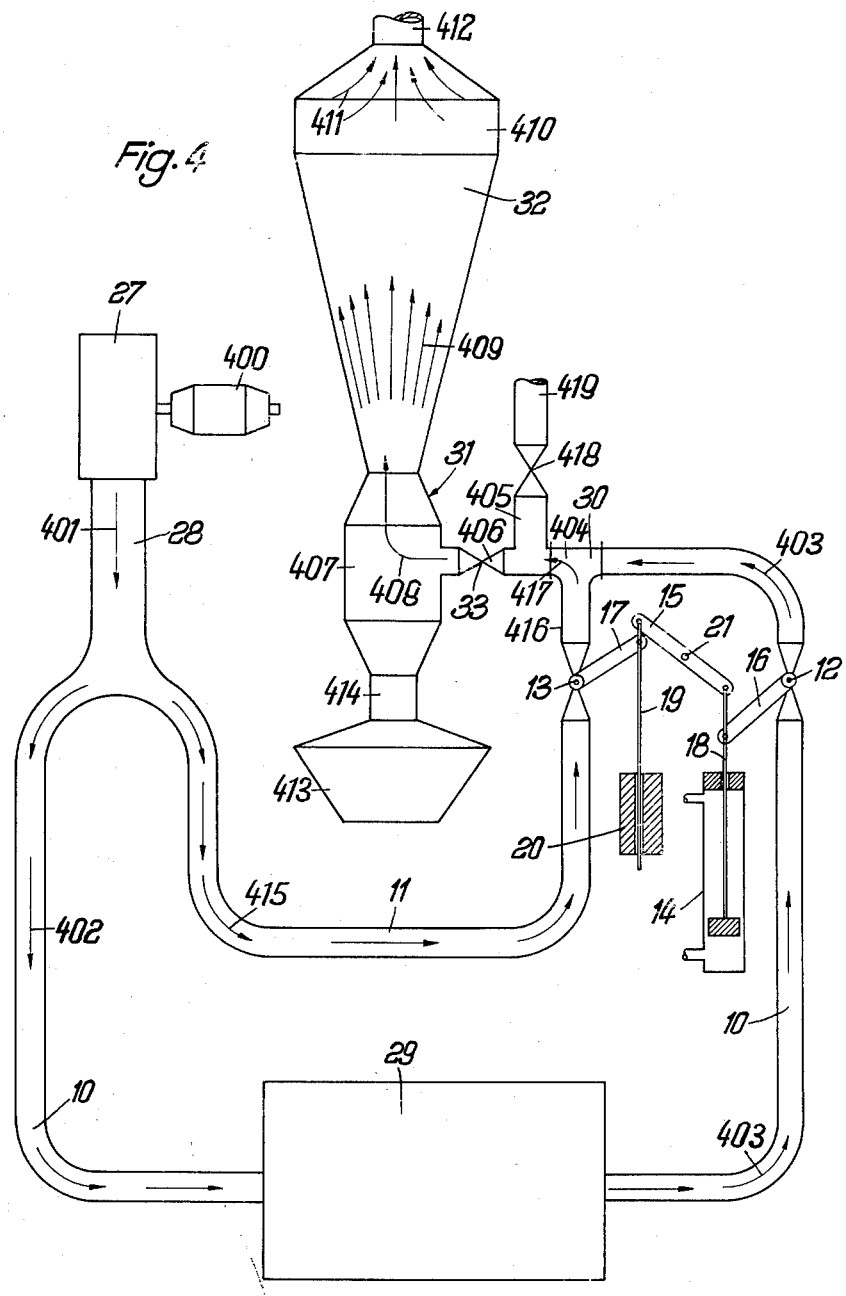

2,975,526

DEVICES FOR HEAT TREATING KERNELS AND SEEDS

Ernst G. W. Heimbs and Walter C. Kangro, Braunschweig, Germany, assignors to Heimbs & Sons, Braunschweig, Germany Filed May 15, 1956, Ser. No. 585,001

Claims priority, application Germany May 26, 1955

5 Claims. (Cl. 34—57)

The present invention relates to a method and a device for heat treating kernels and seeds, and more particularly to methods and devices for roasting coffee beans, grains, and similarly shaped food products and fractions thereof.

It has been suggested heretofore to suspend the kernels and seeds in an air current having a constant temperature.

It is an object of the present invention to avoid the considerable drawbacks incurred by subjecting the suspended food products to an air current of constant temperature.

It is another object of the present invention to reduce the roasting temperature during the end phase of roasting.

It is a further object of the present invention to adapt the heat treatment or roasting of the small food products to the conditions to be satisfiied in any particular case.

Other objects and advantages of the present invention will be apparent from the following detailed description thereof in connection with the accompanying drawings, showing, by way of example, diagrammatically, some embodiments of the present invention.

In the drawings:

Fig. 1 is a diagrammatic side elevation of some parts of a first embodiment of the present invention;

Figs. 2 and 3 are, respectively, diagrammatic side elevations of somewhat modified embodiments of the invention shown in Fig. 1, and Fig. 4 is a diagrammatic side elevation showing a complete apparatus for carrying out the method according to the present invention.

Before referring to the drawings in detail, the method according to the present invention will be described more in detail.

This method comprises the step of changing the temperature prevailing in the flow of the roasting gaseous medium by admixing different gaseous media having different temperatures, this temperature change being effected according to choice, that is, in accordance with the prevailing necessities. The gaseous medium having a different temperature may have the same composition as the originally used gaseous medium. If, for instance, coffee beans are roasted by an air current having a predetermined temperature, air having a different temperature may be admixed optionally to this air current. The temperature of the admixed gaseous medium has to be different from that of the gaseous medium which had been applied originally, and may be higher or lower than the latter temperature. The difference of temperatures and the sign thereof is adjusted according to the needs of the case.

In a particular embodiment of the method according to the invention, a foreign gas having a different temperature is admixed to the originally present roasting gas, for instance in roasting coffee beans air having a predetermined and constant temperature is admixed with carbon dioxide or nitrogen, or the like, having a different, preferably lower temperature. In this manner, it is prevented that the coffee beans are not only treated by air having a too high temperature, but also the roasting process as such is chemically controlled, so as to prevent an oxidation of the coffee beans.

Preferably the gas having a different temperature is admixed in such a quantity that at the admixture the total quantity of the gas passing through the roasting space proper is maintained entirely or approximately constant. In order to accomplish this, the admixture of the gas having a different temperature should be effected in such a quantity per minute as to deduct this quantity from the quantity per minute of the originally supplied roasting gas. However, these conditions have not strictly to be adhered to, and an approximate satisfying of the same will be sufficient.

The quantity and the velocity of the admixed gas are related to each other and to the quantity and velocity of the remaining original roasting gas, so that the carrying capacity of the total gas mixture for the roasted material is changed either little or not at all. Also, this step of the technical performance may be changed within wide limits, so as to render possible just by these means a very good adaptation to the requirements of any actual case.

The method according to the present invention is not limited to the admixing of only one gas having a different temperature; in the course of a roasting operation it may become necessary to admix a plurality of gases having a different temperature or the same gas at different temperatures. For instance, it may be necessary in the roasting of coffee beans in an air current to reduce a little the orginally high temperture of the roasting air flow at first by admixing to the same some cooler air, and then, in the end phase of the heat treatment, to influence chemically the roasting proper by admixing of carbon dioxide having a different and preferably lower temperature.

The method according to the present invention may be reduced to practice in various manners. A preferred arrangement for carrying out the method comprises a coupling of throttling or closing members arranged in the various paths of the gas, as more fully disclosed hereinafter with reference to the accompanying drawings. This coupling operates so that the release or widening of a path effects automatically changes of the cross section, such as contractions or even sealings, in other paths of the gas. Preferably two different paths of the gas are provided which are flowed through by quantities of gases which are tuned with one another by this coupling.

Preferably this coupling is adjusted according to the prevalent conditions, whereby the fractions to which the individual paths are either throttled or opened may be quite different. If, for instance, one of the throttle valves is constricted by 10%, the other throttle valve coupled therewith need not necessarily be enlarged 10% but may be enlarged, for instance, only by 8%. The values to be adopted in any individual case depend on the existing arrangements, particularly on the resistances to flow of the conduits.

The coupling of the throttling and/or shutting off members is effected according to the invention by means of infinitely variable members controlling the degree of throttling or opening.

Referring now to the drawings and first to Fig. 1, two conduits 10, 11, issuing from a common conduit (shown in Fig. 4) provided with a blower (shown in Fig. 4) conduct the air to a roasting chamber shown in Fig. 4, and are provided, respectively, with throttle valves 12, 13, which may be designed as shut-off devices. The throttle valve 12 is adjustable by means of a pneumatically operated adjusting device generally denoted by 14 and including a pneumatic cylinder 114 closed at one end by a stopper 115 having a central bore guiding in a fluid-tight manner a piston rod 18 which carries at one end thereof a piston 116 cooperating with the cylinder 114 which is provided with feed and exit pipes 117, 118, for the pressure fluid. The piston rod 18 is connected by a pin 119 with the slot 120 of a lever 16 connected with the throttle valve 12. The piston rod 18 is connected with another pin 23 movable in a slot 25 of one arm 121 of a two-armed lever 15 rotatably supported by a pin 21 adjustable in horizontal or substantially horizontal direction in a rectilinear slot 22 of a stationary member 122. The other arm 123 of the two-armed lever 15 is provided with a slot 26 in which is movably arranged a pin 24 connected with a rod 19 guided in substantially vertical direction by guiding members 20 and 20′, each having a central bore for the rod 19. The latter carries a pin 124 engaging a slot 125 in a lever 17 connected at one end thereof with the axle of the throttle valve 13.

The operation of this device is as follows:

The two throttle valves 12, 13 are coupled with each other by a leverage including the two-armed lever 15. When the pin or pivot 21 of same is adjusted within the rectilinear slot 22 of the stationary member 122, the coupling of the throttle valves 12, 13 may be changed quantitatively. Only when the pivotal pins 23, 24 of the rods 18, 19 have equal distances from the pivot pin 21 of the two-armed lever 15 the throttle valve 12 is imparted by the piston rod 18 and the lever 16, for instance, an opening movement equaling the closing movement imparted by the rod 19 and the lever 17 to the throttle valve 13. However, when the pivots 23, 24 of the rods 18, 19 are imparted, respectively, distances from the pivot pin which differ from one another, the throttle valve 13 changes the position thereof by an amount differing from that by which the throttle valve 12 changes the position thereof.

By these means it is achieved that the degree of coupling may be changed during an action of the device shown in Fig. 1 and adjusted according to requirements. This change of the degree of the coupling between two or more gas paths is not limited to the mechanical devices shown in Figs. 1 to 3 but is to be regarded as a general characteristic of the present invention.

For instance, if the two conduits 10, 11 have different resistances to flow, the same may be taken into consideration by a change of the degree of coupling between the two throttle valves 12, 13. Thus, in a preferred embodiment of the invention, the device for shifting the pivot 21 within the slot 22 is provided with means (not shown) for operating the shift easily and measurably as to the amount thereof from a centrally arranged operating stand (not shown) of the roasting plant (not shown), and may be inserted, if desired, in an automatically operating device (not shown).

In order to facilitate and improve the adjustment of the two gas currents to different resistances to flow the arrangements shown in Figs. 2 and 3 are provided.

According to Fig. 2 of the drawings, the rectilinear lever 15 is replaced by a lever 215 which is convex toward the lower portion of the apparatus and provided with convex slots 225 and 226, replacing the rectilinear slots 25 and 26 shown in Fig. 1.

On the embodiment shown in Fig. 3, the lever 315 replacing the straight lever 15 shown in Fig. 1 is concave toward the lower portion of the apparatus and provided with concave slots 325 and 326 replacing, respectively, the rectilinear slots 25 and 26 shown in Fig. 1.

The couplings of the throttling members 12 and 13 by means of the levers 15, 215, and 315, shown in Figs. 1 to 3, are by no means to be understood as the sole possibilities of an infinitely variable coupling of two or more throttling members. For instance, they might be designed as electrical drives (not shown) operating over corresponding relay controls (not shown) such as disclosed in our copending application, Serial No. 434,862, filed June 7, 1954, for "Treatment of Coffee and Other Materials," now Patent No. 2,859,116. Or else, the couplings shown in Figs. 1–3 and described hereinabove might be replaced by other pneumatically actuated couplings (not shown) or the like.

According to the invention, the temperature of the roasting gas is changed by admixing other gas currents having different temperatures. Thus, according to the invention, the individual currents of gases, namely the current of roasting gas proper and the other currents of gases to be admixed to same, may be tapped from different sources, such as different blowers. Since the suspended state of the objects to be roasted is very sensitive to the quantities and velocities of the gases, the various blowers have to be adjusted and maintained very accurately as to the effects thereof, so that much supervision and/or additional adjusting members are required.

In order to overcome this difficulty, according to a preferred embodiment of the present invention, the gas currents to be admixed to one another are tapped from a single gas current and subjected, on the further route to the roasting apparatus, to heat treatments which are different from one another; by these means a flow, as uniform as possible, is obtained in the roasting apparatus proper.

Referring now to Fig. 4 of the drawings, showing diagrammatically such a plant, a blower 27 driven by an electric motor 400 generates a current of a gas, for instance air, which enters, in the direction of the arrow 401, a conduit 28 which branches into the conduits 10 and 11 shown in part in Fig. 1. The gas current within the conduit 10, indicated by the arrows such as 402, enters a furnace 29 and leaves the same as a heated gas current 403 entering the throttle valve 12 more fully disclosed in connection with Fig. 1. After passing the throttle valve 12 the gas current 403 enters the horizontal part 404 of a T 30 which is connected with a conduit 405 to be mentioned hereinafter. The conduit 405 is connected with another conduit 406 provided with a shut-off valve 33 and connected to the lower portion 407 of a roasting apparatus generally denoted by 31, from which the gas current 408 enters the roasting chamber 32 proper, in which the gas current 408 branches off into several currents 409 by which the objects, such as coffee beans, nuts, and so on, are roasted. The uppermost portion 410 of the roasting apparatus 31 is provided with slots (not shown) for allowing air currents, such as 411, to enter from the outside, so that the roasted objects are cooled, after which the air currents are discharged through the outlet 412.

Below the lower portion 407 of the roasting apparatus 31 a chamber 413 for the roasted objects, such as coffee beans, to be withdrawn is arranged and connected by intermediate pieces, such as 414, with the lower portion 407 of the roasting apparatus 31.

The gas current 415, passing through the conduit 11, is not heated and enters cold through the throttling valve 13 the lower vertical part 416 of the T 30 where it is admixed to the gas current 403, so as to form a combined gas current 417 flowing over the conduit 405 into the conduit 406 provided with shut-off valve 33, as pointed out hereinabove.

The quantities per minute of the gas currents 403 and 415 are dependent on the positions of the throttle valves 12, 13, coupled with one another by the two-armed lever 15 more fully described hereinabove in connection with Fig. 1, reference to which is made for the sake of brevity.

As will be seen from Fig. 4, the conduit 405 is connected to a throttle valve 418 connected in turn to another conduit 419 which may be a conduit for admixing to the combined gas current 417 another current (not shown) of gas or air, preferably at normal temperatures.

The mixing of the gas currents 403 and 415 is effected by the T 30. However, although other mixing places might be chosen instead, the mixing within the T 30 is to be preferred because the same is situated as near as possible to the conduits 405, 406 leading the gases to the shut-off valve 33 to be actuated shortly before the roasting material is to be discharged.

We have described hereinabove preferred embodiments of a method and device for roasting kernels and seeds, such as coffee beans. However, it should be understood that various changes, modifications, and/or substitutions of equivalents might be made in the devices described hereinabove, the scope of our invention being defined by the appended claims.

We claim:

1. In a device for roasting kernels and seeds, such as coffee beans and the like, in combination, means defining a roasting chamber for holding said kernels to be roasted, said roasting chamber being of increased cross-section at the top end, a first conduit and a second conduit carrying a gaseous medium to said chamber, first throttling means arranged in said first conduit, pneumatically operated means for adjusting said first throttling means, second throttling means arranged in said second conduit, means for adjusting said second throttling means, means for coupling said throttling means with each other, said coupling means effecting a change of the cross-section of said first throttling means and simultaneously an opposite change of the cross-section of said second throttling means, said coupling means comprising, a substantially straight two-armed lever having two straight slots, a slotted stationary member and a pivot therein on which said lever is mounted, a pair of rods, each of said rods mounted for pivotal and sliding engagement with one of said slots in said lever, and a pair of slotted links, each link engaging with one of said rods and forming connection with one of said throttling means.

2. In a device as defined in claim 1, said rods having points of articulation in said pair of slots in said lever and other points of articulation in said slotted links, which permit adjustment of the cross-sections of said throttling means in minute amounts, differing from each other in the two throttling means.

3. In a device according to claim 1 further including, means for changing during the roasting period the adjustment of the two throttling means.

4. In a device for roasting kernels and seeds, such as coffee beans and the like, in combination, means defining a roasting chamber for holding said kernels to be roasted, said roasting chamber being of increased cross-section at the top end, a first conduit and a second conduit carrying a gaseous medium to said chamber, first throttling means arranged in said first conduit, pneumatically operated means for adjusting said first throttling means, second throttling means arranged in said second conduit, means for adjusting said second throttling means, means for coupling said throttling means with each other, said coupling means effecting a change of the cross-section of said first throttling means and simultaneously an opposite change of the cross-section of said second throttling means, said coupling means comprising, a two-armed lever having two curved slots, a pair of rods, each of said rods mounted for pivotal and sliding engagement with one of said slots in said lever, and a pair of slotted links, each link engaging with one of said rods.

5. Apparatus as defined in claim 4 further including, a slotted stationary member and a pivot therein on which said lever is mounted, and each link forming connection with one of said throttling means.

References Cited in the file of this patent

UNITED STATES PATENTS

| | | |
|---|---|---|
| 1,221,383 | Secord | Apr. 3, 1917 |
| 1,563,963 | Byrd | Dec. 1, 1925 |
| 1,568,738 | Jones | Jan. 5, 1926 |
| 2,105,778 | Behr et al. | Jan. 18, 1937 |
| 2,132,656 | Smith | Oct. 11, 1938 |
| 2,143,505 | Arnold | Jan. 10, 1939 |
| 2,497,501 | Himmel et al. | Feb. 14, 1950 |
| 2,715,282 | Niven | Aug. 16, 1955 |
| 2,857,683 | Schytil | Oct. 28, 1958 |

FOREIGN PATENTS

| | | |
|---|---|---|
| 472,391 | Germany | Feb. 27, 1929 |